United States Patent [19]

Suganuma et al.

[11] Patent Number: 5,176,730
[45] Date of Patent: Jan. 5, 1993

[54] METHOD OF PRODUCING OPTICAL-FIBER COUPLER

[75] Inventors: Hiroshi Suganuma; Hiroaki Takimoto; Hiroshi Yokota, all of Kanagawa; Kazuhiko Arimoto, Tokyo, all of Japan

[73] Assignees: Sumitomo Electric Industries, Ltd., Osaka; Sumiden Opcom, Ltd., Tokyo, both of Japan

[21] Appl. No.: 843,941

[22] Filed: Feb. 18, 1992

[30] Foreign Application Priority Data

Feb. 19, 1991 [JP] Japan .................................. 3-24353

[51] Int. Cl.⁵ ...................... C03B 23/20; G02B 6/26
[52] U.S. Cl. .............................. 65/4.2; 65/3.11; 65/4.21; 65/29; 385/28
[58] Field of Search ............. 65/2, 3.11, 4.2, 4.21, 65/29; 385/28

[56] References Cited

U.S. PATENT DOCUMENTS

| | | | |
|---|---|---|---|
| 3,847,579 | 11/1974 | Fulk et al. | 65/2 X |
| 4,682,994 | 7/1987 | Mansfield | 65/3.12 |
| 4,765,816 | 8/1988 | Bjornlie et al. | 65/4.2 |

Primary Examiner—Robert L. Lindsay
Attorney, Agent, or Firm—Cushman, Darby & Cushman

[57] ABSTRACT

The invention provides a method for producing an optical-fiber coupler with a preset branching ratio. The present invention relates to a method in which part of a plurality of optical fibers are made to closely contact with each other so as to form a coupler. The coupler is heated to thereby obtain a predetermined branching ratio; the flow rate of a gas to be supplied to a heat source is increased/decreased by a quantity proportional to a difference between the drawing speed and a preset drawing speed while predetermined tension is applied to the optical fibers.

3 Claims, 3 Drawing Sheets

METHOD OF PRODUCING OPTICAL-FIBER COUPLER

BACKGROUND OF THE INVENTION

1. Field of the Invention

The present invention relates to a method of producing an optical-fiber coupler to be used, for example, in optical communications or light measurements.

2. Description of Related Art

A fiber-type coupler is a device for branching/coupling light between a plurality of optical fibers. At present, a melt-drawing method is considered to be the most suitable for producing a single-mode fiber coupler ("The Latest Technique of Optical-Fiber Coupler", OPTORONICS, No.5, 1988, P.125). Such a melt-drawing method involves; partly removing the respective coatings of two optical fibers so as to form exposed portions; twisting the exposed portions so as to closely contact with each other or fixed so as to contact closely and parallel to each other; and, drawing this bundled portion while heating and fusing the bundled portion with a burner or the like.

At the same time, light which has been incident from one end of the optical fibers is measured at the other ends of the optical fibers so that the light branching ratio is detected. Drawing is stopped when a predetermined branching ratio is obtained. Finally, the optical fibers are fixed and made to adhere to a protection member to thereby produce a fiber-type coupler.

In the foregoing conventional method, optical fibers are drawn while only the branching ratio is being monitored. In such a method, however, the diameters of optical fibers decrease as the drawing advances, thereby increasing the drawing speed so that it is difficult to stop the drawing when the branching ratio has reached a desired, predetermined value. In the worst case, the optical fibers are broken.

Further, the refractive index of the heated glass differs from that of the finished product. This makes it impossible to measure the branching ratio of the heated product to create a finished, cooled product with a predetermined branching ratio. This makes it impossible to obtain a coupler having the branching ratio of a desired finished value.

SUMMARY OF THE INVENTION

The present invention provides a method in which the problems of the conventional method described above are overcome and an optical-fiber coupler is produced stably, with the desired branching ratio, with high precision. Specifically, the present invention provides a method of producing an optical-fiber coupler in which part of a plurality of optical fibers are made to closely contact with each other so as to form a coupler forming portion. The coupler forming portion is then heated and drawn. The optical fibers are drawn by the method of the present invention at a drawing speed while receiving constant tension and while increasing/decreasing the flow rate of a flaming gas to be supplied to a heat source by a quantity proportional to a difference between the drawing speed and a preset drawing speed. The method of the present invention provides a computer feedback loop to adjust the heating rate as a function of the drawing speed and measured branching ratio.

In order to obtain the effects of the present invention, it is preferable that a branching ratio of a coupler is measured during heating and drawing so that the preset drawing speed is made to be a function of the branching ratio; that the function is established so that the drawing speed approaches zero as the branching ratio approaches a final target value; and that the heat source is a burner having a plurality of gas ejection outlets arranged along the axial direction of the optical fibers, the burner being fixed during heating.

BRIEF DESCRIPTION OF THE DRAWINGS

Specific components in the figures are explained in more complete detail through the Detailed Description of the Preferred Embodiments, and hence, will not be repeated here.

In the accompanying drawings.

DETAILED DESCRIPTION OF THE PREFERRED EMBODIMENTS

Figure 1:
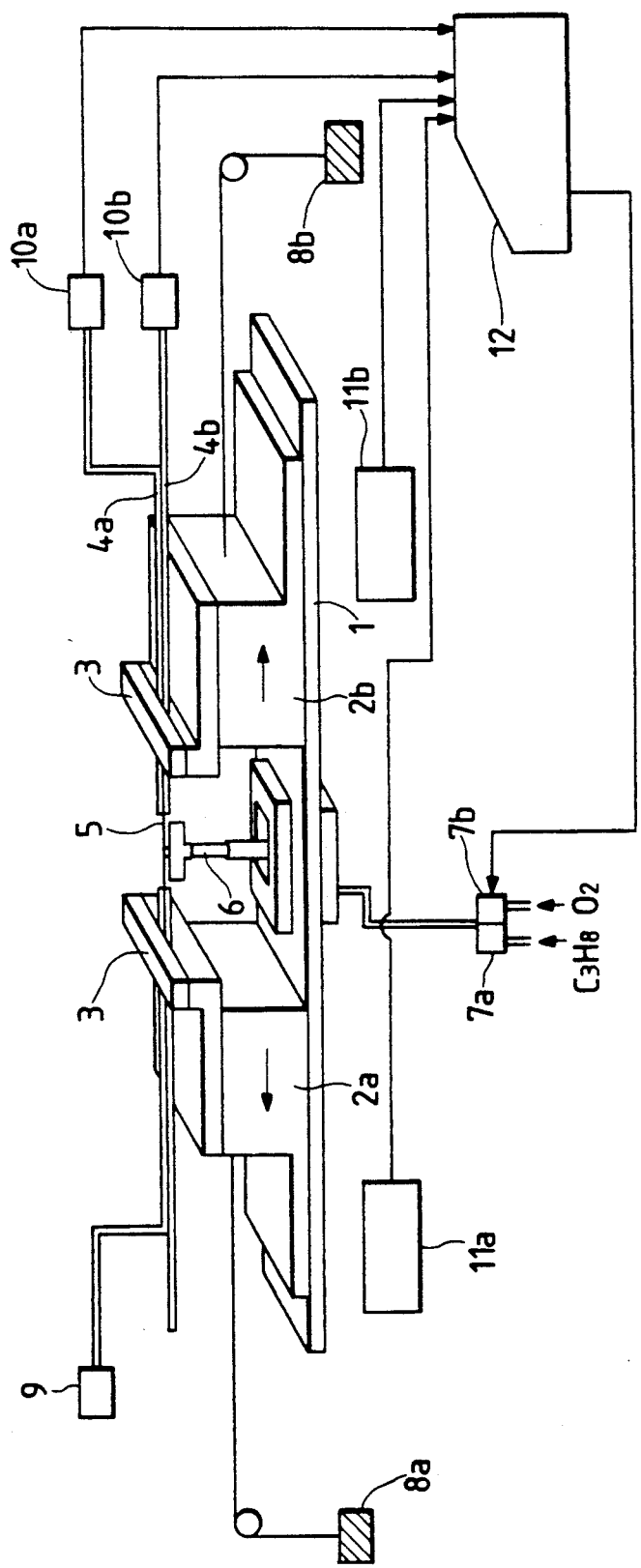
FIG. 1 is a perspective view of an apparatus for producing an optical-fiber coupler, for use in an embodiment of the present invention.

The method of the present invention is characterized by reference to FIG. 1, wherein the drawing speed V of two optical fibers is measured during drawing of the optical fibers and the quantity W of gas of the flaming burner is increased/decreased by the quantity $\Delta W$ of gas proportional to a difference between the measured speed and a preset drawing speed $V\phi$ ($W = W \pm \Delta W$).

The drawing speed of an optical fiber is a function of the cross section of the optical fiber, the drawing tension, and the heating temperature.

According to the present invention, the drawing tension acting on two fibers constituting a coupler is made constant so that the drawing speed is always made to approach a set value. Controlling the flow rate of gas prevents the optical fibers from being broken by the rapid increase of the drawing speed when the optical fibers are heated and drawn causing the optical fibers to become thin.

From the results of experiments, it was found that the following relation had to be established in order to change the flow rate of gas and thereby keep the drawing speed to a set value.

$$\Delta W = gi(V\phi - V) \qquad (1)$$

Here, $\Delta W$ represents the quantity of change of the flow rate of gas (cc/min).
$V\phi$ represents a set drawing speed (mm/min).
$V$ represents a drawing speed (mm/min).
gi represents a constant.
g1: $V\phi - V \geq 0$
g2: $V\phi - V < 0$
where: $g2 \geq g1 > 0$ This is because the flow rate of gas is rapidly decreased so as to prevent optical fibers from being broken when the drawing speed becomes higher than the set value.

Further, light from the light source is made incident into one of the two optical fibers and the light coming out of the two optical fibers is monitored to measure the branching ratio, SR during drawing of the two optical fibers so that a fixed relation can be established between the set drawing speed V$\phi$ and SR.

$$V\phi = F(SR) \qquad (2)$$

Figure 2:
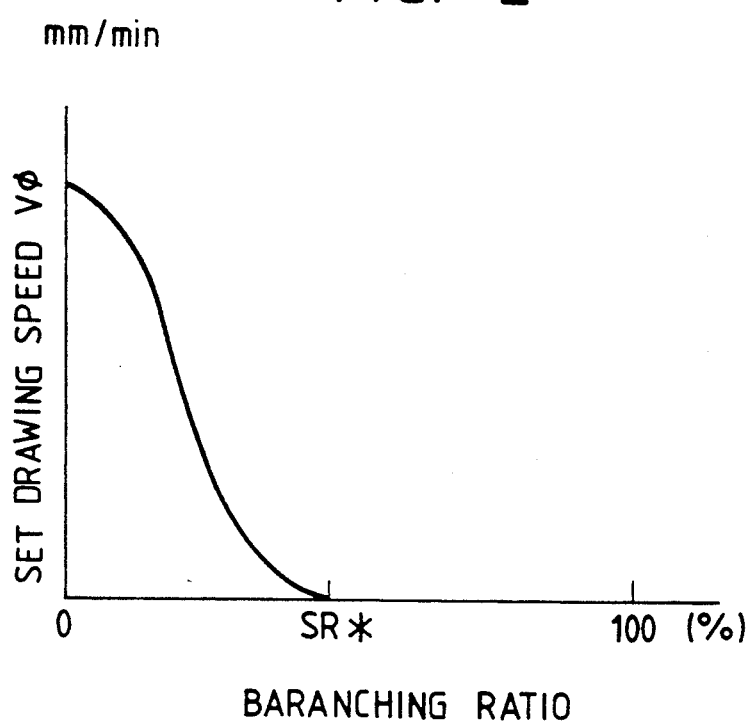
FIG. 2 is a graph showing an example of the relationship between the branching ratio SR and the set drawing speed $V\phi$, for use in the present invention.

The function of F(SR) may be selected to be $e^{-SR}$, $SR^{-n}$, or the like to thereby decrease the drawing speed V as the branching ratio approaches to a desired value SR* as shown in FIG. 2. In this condition, the drawing speed becomes low as the branching ratio approaches to the final target value so that the branching ratio can be easily obtained with high precision.

As an example of the utility of the method of the present invention, a coupler having a branching ratio of 50% was produced by using an apparatus for producing an optical-fiber coupler shown in FIG. 1. In the drawing, the reference numeral 1 designates a furring table; 2a and 2b, drawing stages; 3, clamps; 4a and 4b, optical fibers; 5, optical-fiber exposed portions; 6, a burner; 7a and 7b, controllers for controlling the flow rate of flaming gas; 8a and 8b, weights for applying constant tension to the optical fibers; 9, a light source; 10a and 10b, photo-detectors; 11a and 11b, detectors for measuring the distance of movement of the drawing stages; and 12, a computer.

A pair of clamps 3 are provided on the furring table 1 so as to be in opposition to each other through the drawing stages 2a and 2b and the two optical fibers 4a and 4b having the exposed portions 5 in which the respective coatings of the optical fibers are partially removed are fixed to the clamps 3. The exposed portions 5 are fixed so as to be disposed between the clamps 3 and 3, and the burner 6 which is a heat source, is disposed just below the exposed portions 5. The exposed portions 5 of the optical fibers are heated by the burner 6 and the drawing stages are pulled in directions opposite to each other so as to enlarge the distance of the exposed portions 5 to thereby form a predetermined coupler.

Figure 3:
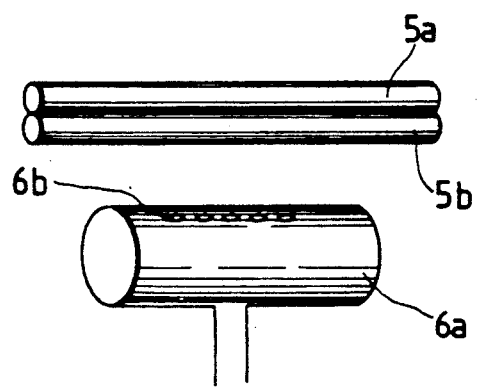
FIG. 3 is a perspective view of a burner for use in the embodiment of the present invention.
Figure 4:
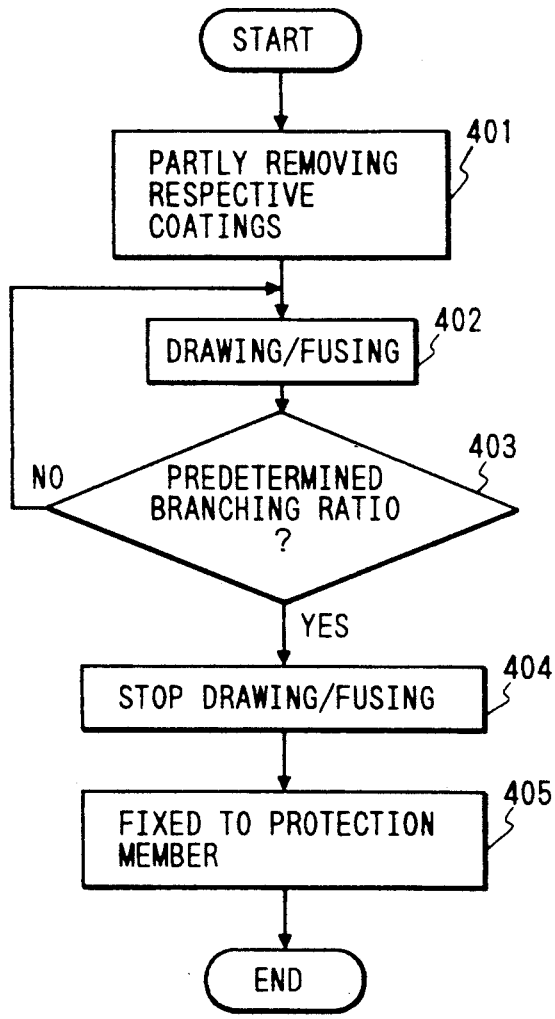
FIG. 4 is a flow chart for explanation of a conventional producing process.
Figure 5:
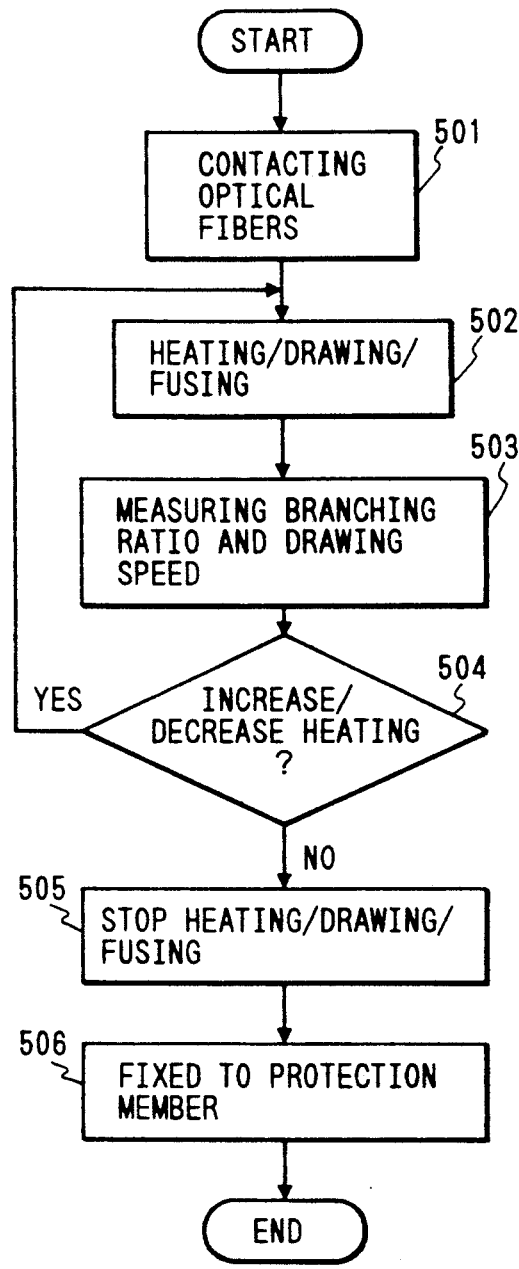
FIG. 5 is a flow chart for explanation of the process of the present invention.

By using a burner having a plurality of gas ejection outlets, 6b, arranged along the axial direction of the optical fibers as shown in FIG. 3 of the burner, 6, it was possible to realize a fixed temperature all over the area to be heated. Therefore, the burner was fixed to perform heating.

Constant tension was applied to the exposed portions, 5, by the weights, 8a and 8b, attached on the drawing stages, 2a and 2b, respectively in FIG. 1. Propane gas and oxygen gas flowing, as flaming gas, into the burner, 6, are respectively supplied by the flow rate controllers, 7a and 7b which operate under instructions from the computer, 12.

Further, the computer receives the outputs from the detectors, 11a and 11b, for detecting the distance of movement of the drawing stages and the outputs of the photo-detectors, 10a and 10b, for detecting the intensity of light which is emitted from the light source, 9, and made to come out from the optical fibers, 4a and 4b, through the exposed portions, 5, constituting a coupler. The computer, 12, calculates the drawing speed V and the branching ratio SR on the basis of those inputs to the computer. Moreover, the computer 12 calculates $\Delta V$ by using the foregoing expression (1) to thereby operate the flow rate controllers, 7a and 7b.

When 100 optical-fiber couplers were produced so as to have a branching ratio of 50%, all the couplers had a branching ratio which fell within a range of 50±3%, and the drawing time per coupler was one minute.

In summary, by the method according to the present invention, it is possible to consistently produce optical-fiber couplers with branching ratios within a desired range with a high degree of precision.

What is claimed is:

1. A method of producing an optical-fiber coupler comprising the steps of:
    contacting a plurality of optical fibers to form a coupler forming portion;
    heating the coupler forming portion with a flaming gas from a heat source;
    drawing the optical fibers at a drawing speed under constant tension;
    measuring the branching ratio of said coupler continuously during said drawing;
    measuring said drawing speed; and
    regulating the quantity of said flaming gas proportional to the difference between said drawing speed and a preset drawing speed, wherein said preset drawing speed is made a function of said branching ratio.

2. The method of producing an optical-fiber coupler according to claim 1, wherein said function is calculated so that said drawing speed approaches zero as said branching ratio approaches a final target value.

3. The method of producing an optical-fiber coupler according to claim 1, wherein said heating step comprises the step of heating with a plurality of gas ejection outlets arranged along the axial direction of said optical fibers.

* * * * *